United States Patent
Di Mola et al.

(10) Patent No.: US 10,014,937 B1
(45) Date of Patent: Jul. 3, 2018

(54) TIMING SYNCHRONIZATION AND INTRUSION DETECTION VIA AN OPTICAL SUPERVISORY CHANNEL (OSC)

(71) Applicant: Juniper Networks, Inc., Sunnyvale, CA (US)

(72) Inventors: Domenico Di Mola, Fremont, CA (US); Gert Grammel, Ditzingen (DE)

(73) Assignee: Juniper Networks, Inc., Sunnyvale, CA (US)

( * ) Notice: Subject to any disclaimer, the term of this patent is extended or adjusted under 35 U.S.C. 154(b) by 167 days.

(21) Appl. No.: 15/067,619

(22) Filed: Mar. 11, 2016

(51) Int. Cl.
*H04L 29/06* (2006.01)
*H04B 10/079* (2013.01)
*H04L 7/00* (2006.01)

(52) U.S. Cl.
CPC ....... *H04B 10/0795* (2013.01); *H04L 7/0075* (2013.01); *H04L 63/1416* (2013.01)

(58) Field of Classification Search
CPC .............. H04B 10/0795; H04L 7/0075; H04L 63/1416
USPC ......................................................... 726/23
See application file for complete search history.

(56) References Cited

U.S. PATENT DOCUMENTS

| | | | | |
|---|---|---|---|---|
| 4,476,527 A * | 10/1984 | Clayton, IV | ............ | G06F 13/30 710/29 |
| 6,157,295 A * | 12/2000 | Steiner | ................. | B60G 17/016 280/5.5 |
| 6,330,236 B1 | 12/2001 | Ofek et al. | | |
| 6,532,088 B1 | 3/2003 | Dantu et al. | | |
| 7,069,337 B2 | 6/2006 | Rawlins et al. | | |
| 7,076,803 B2 | 7/2006 | Bruton, III et al. | | |
| 7,174,566 B2 | 2/2007 | Yadav | | |
| 7,924,746 B2 | 4/2011 | Gerstel | | |
| 8,351,784 B2 | 1/2013 | Kim et al. | | |
| 2007/0110024 A1 * | 5/2007 | Meier | ..................... | H04L 45/04 370/351 |
| 2009/0203403 A1 * | 8/2009 | Gidron | .................... | H04L 51/38 455/557 |
| 2009/0279890 A1 * | 11/2009 | Duan | ................. | H04B 10/0775 398/58 |

(Continued)

OTHER PUBLICATIONS

Wikipedia, "Synchronous Ethernet," https://en.wikipedia.org/wiki/Synchronous_Ethernet, Oct. 22, 2015, 6 pages.

(Continued)

*Primary Examiner* — Michael S McNally
(74) *Attorney, Agent, or Firm* — Harrity & Harrity, LLP

(57) ABSTRACT

A device may receive, via a first optical supervisory channel, a first timing signal from a first network node. The first timing signal may be generated by a first clock, of the first network node, and may be used to synchronize the first clock, of the first network node, and a second clock of a second network node. The device may determine a parameter value based on the first timing signal, and may determine whether the parameter value satisfies a threshold value. The device may selectively transmit, via a second optical supervisory channel, a second timing signal to the second network node based on determining whether the parameter value satisfies the threshold value. The second timing signal may be used to synchronize the second clock, of the second network node, with the first clock of the first network node.

20 Claims, 6 Drawing Sheets

(56) References Cited

U.S. PATENT DOCUMENTS

| | | | |
|---|---|---|---|
| 2010/0020908 A1* | 1/2010 | Goldfisher | H04B 3/54 375/358 |
| 2014/0199072 A1* | 7/2014 | Nuijts | H04J 3/0682 398/75 |
| 2014/0281652 A1* | 9/2014 | Methar | G06F 1/12 713/400 |
| 2016/0087806 A1* | 3/2016 | Genter | G06F 21/64 713/178 |
| 2017/0039364 A1* | 2/2017 | Sadhasivan | H04L 9/0819 |

OTHER PUBLICATIONS

Wikipedia, "Wavelength-division multiplexing," https://en.wikipedia.org/wiki/Wavelength-division_multiplexing, Sep. 15, 2015, 9 pages.

Wikipedia, "Precision Time Protocol," https://en.wikipedia.org/wiki/Precision_Time_Protocol, Oct. 20, 2015, 5 pages.

* cited by examiner

TIMING SYNCHRONIZATION AND INTRUSION DETECTION VIA AN OPTICAL SUPERVISORY CHANNEL (OSC)

BACKGROUND

A man-in-the-middle attack may occur when an intruding device is inserted between two communicating network nodes. The intruding device may intercept, modify, and/or re-transmit data packets throughout the network. By eavesdropping on a fiber optic channel, the intruding device may compromise network security.

SUMMARY

According to some possible implementations, a device may receive, via a first optical supervisory channel, a first timing signal from a first network node. The first timing signal may be generated by a first clock, of the first network node, and may be used to synchronize the first clock, of the first network node, and a second clock of a second network node. The device may determine a parameter value based on the first timing signal, and may determine whether the parameter value satisfies a threshold value. The device may selectively transmit, via a second optical supervisory channel, a second timing signal to the second network node based on determining whether the parameter value satisfies the threshold value. The second timing signal may be used to synchronize the second clock, of the second network node, with the first clock of the first network node.

According to some possible implementations, a system may include a first network node to receive, via a first optical supervisory channel, a first timing signal from a second network node. The first timing signal may be generated by a first clock, of the second network node, and may be used to synchronize the first clock, of the second network node, and a second clock of a third network node. The first network node may determine a parameter value based on the first timing signal, and may determine whether the parameter value satisfies a threshold value. The first network node may selectively transmit, via a second optical supervisory channel, a second timing signal to the third network node based on determining whether the parameter value satisfies the threshold value. The second timing signal may be used to synchronize the second clock, of the third network node, with the first clock of the second network node.

According to some possible implementations, a method may include receiving, by a first network node, a first timing signal, via an optical supervisory channel, from a second network node. The first timing signal may be generated by a first clock, of the second network node, and may be used to synchronize the first clock, of the second network node, and a second clock of a third network node. The method may include determining, by the first network node, a parameter value based on the first timing signal. The method may include determining, by the first network node, whether the parameter value satisfies a threshold value. The method may include selectively outputting, by the first network node, a second timing signal or a notification based on determining whether the parameter value satisfies the threshold value. The second timing signal may be output based on determining that the parameter value satisfies the threshold value. The notification may be output based on determining that the parameter does not satisfy the threshold value.

DETAILED DESCRIPTION

The following detailed description of example implementations refers to the accompanying drawings. The same reference numbers in different drawings may identify the same or similar elements.

An optical network may include multiple network nodes that require accurate clock synchronization. The optical network may synchronize clocks of each network node according to a standard (e.g., Institute of Electrical and Electronics Engineers 1588 (IEEE 1588)). IEEE 1588 implements a master/slave clock distribution system, in which a master node distributes timing data to slave nodes. Distributing timing data along with client payload data (e.g., via client payload channels) may require the master node to implement dedicated hardware and/or routing ports associated with various transmission requirements. For example, the master node may be required to transmit timing data at a particular wavelength and/or at a particular bit rate associated with a client payload channel.

Implementations described herein may enable the master node to distribute timing signals via an optical supervisory channel (OSC), and may enable network nodes to detect intrusion on the OSC by determining and/or comparing parameter values associated with the timing signals. Because the OSC is terminated at each network node, network nodes may be able to pinpoint a location of an intrusion by comparing determined parameter values with expected parameter values. Furthermore, the network nodes may save processor, memory, and/or network resources by distributing timing information via the OSC, as compared to distributing timing information via multiple client payload channels.

Figure 1A:
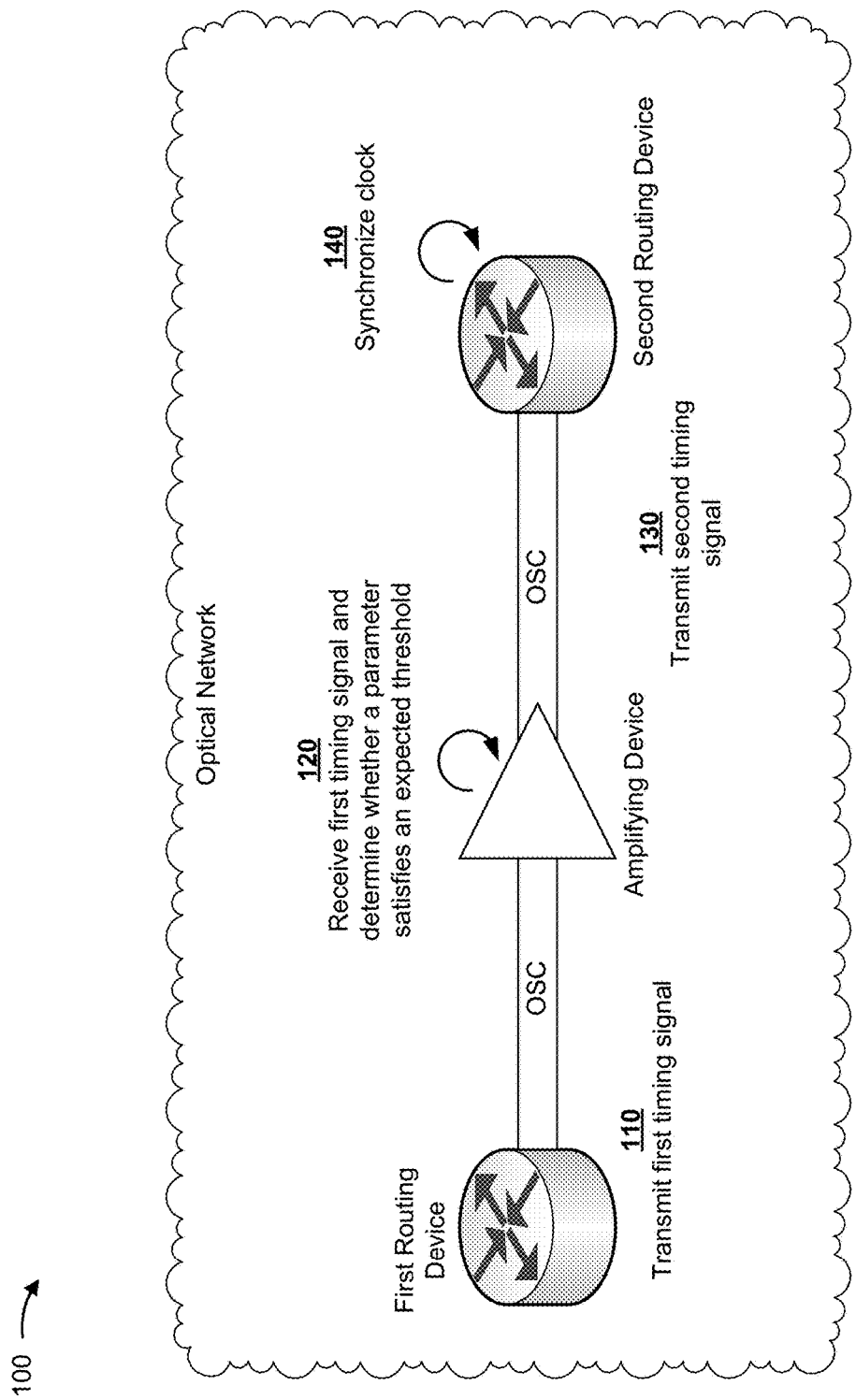
FIGS. 1A and 1B are diagrams of an overview of an example implementation described herein.
Figure 1B:
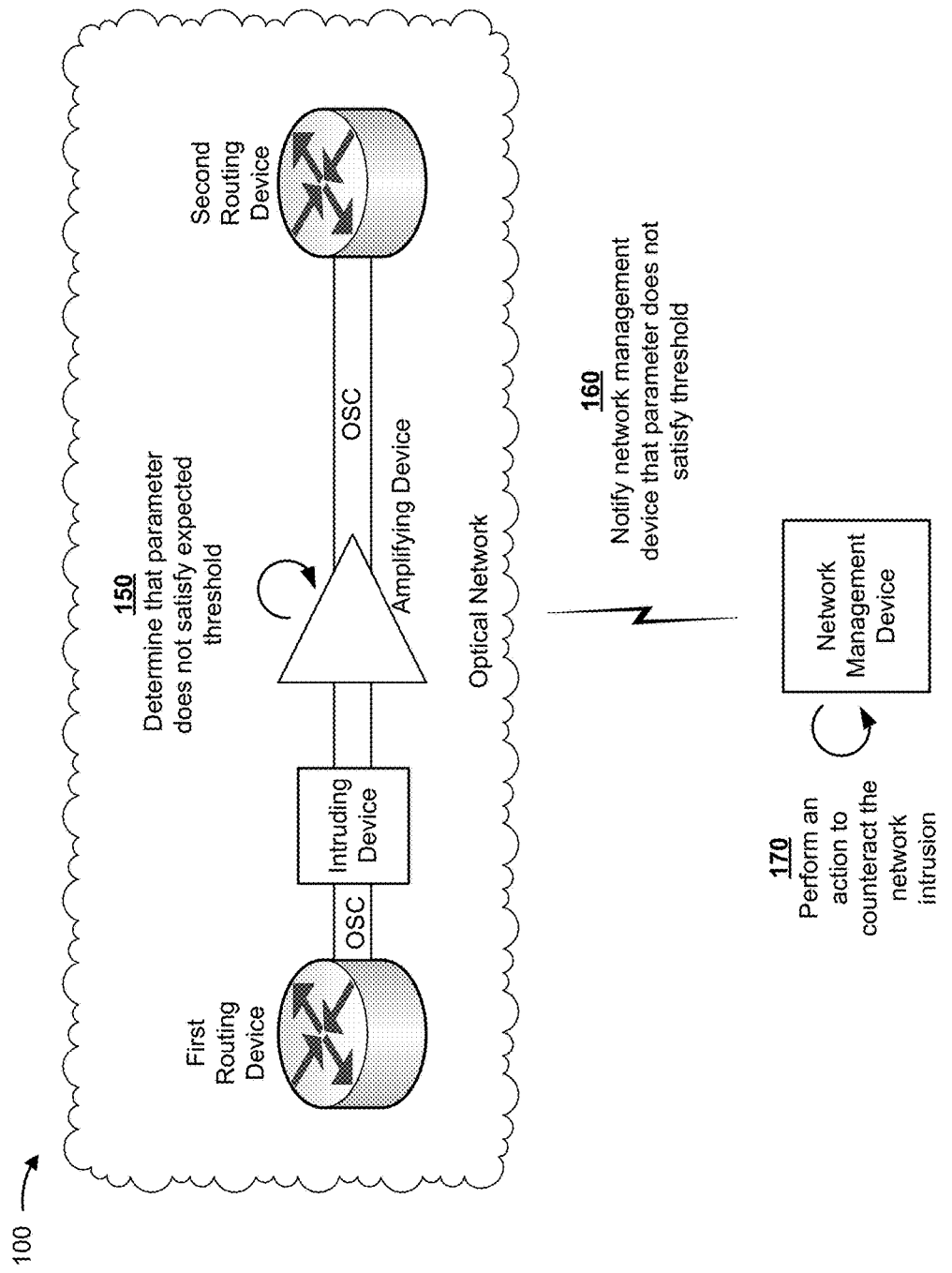

FIGS. 1A and 1B are diagrams of an overview of an example implementation 100 described herein. As shown in FIG. 1A, an optical network may include multiple network nodes such as, a first routing device, an amplifying device, and a second routing device. The first routing device and the amplifying device may be in communication via an OSC, and the amplifying device and the second routing device may be in communication via an OSC. As shown by reference number 110, the first routing device may transmit a first timing signal via the OSC. The first timing signal may include a timestamp of a time of transmission from the first routing device. As shown by reference number 120, the amplifying device may receive the first timing signal and may determine whether a parameter associated with the first timing signal is within an expected threshold. For example, the amplifying device may determine that a network propagation delay value (e.g., a time duration of a transmission between the first routing device and the amplifying device) satisfies an expected network propagation delay value threshold.

As shown by reference number 130, the amplifying device may transmit a second timing signal to the second routing device via an OSC. The second timing signal may include the timestamp of the time of transmission of the first timing signal from the first routing device. In other words, the second timing signal may be the same as the first timing signal, in some cases. As shown by reference number 140, the second routing device may synchronize a clock of the second routing device with a clock of the first routing device based on the second timing signal. By iteratively receiving and/or transmitting time-stamped packets, clocks of network nodes of the optical network may be synchronized.

As shown in FIG. 1B, assume that an intruding device is inserted between the first routing device and the amplifying device to eavesdrop on the optical network. As shown by reference number 150, the amplifying device may determine that a parameter associated with the first timing signal does not satisfy an expected threshold. For instance, the intruding device may introduce additional latency by processing the first timing signal and may, thus, increase a network propagation delay value of the first timing signal transmitted from the first routing device to the amplifying device.

As shown by reference number 160, the amplifying device may transmit a notification to a network management device indicating that the parameter value associated with the first timing signal does not satisfy the expected threshold value. As shown by reference number 170, the network management device may perform an action to counteract the network intrusion, such as monitor traffic between the first routing device and the amplifying device, and/or re-route traffic from the first routing device to a different network node, or the like. In this way, network nodes may pinpoint a location of an intrusion on the optical network by iteratively comparing parameter values, associated with timing signals, with expected parameter values. Furthermore, the network nodes may save memory and/or processor resources by distributing timing signals over a single channel and at a reduced bit rate (e.g., via an OSC), as compared to distributing timing signals over one or more client payload channels. For example, client payload channels may have bit rates that are a particular order of magnitude higher than a bit rate associated with an OSC (e.g., a bit rate value of the OSC may be a hundredth or a thousandth of a bit rate value of a client payload channel, for example).

While systems and/or methods described herein may be described in the context of using a particular clock synchronization standard (e.g., IEEE 1588), in some implementations, another clock synchronization standard may be used.

Figure 2:
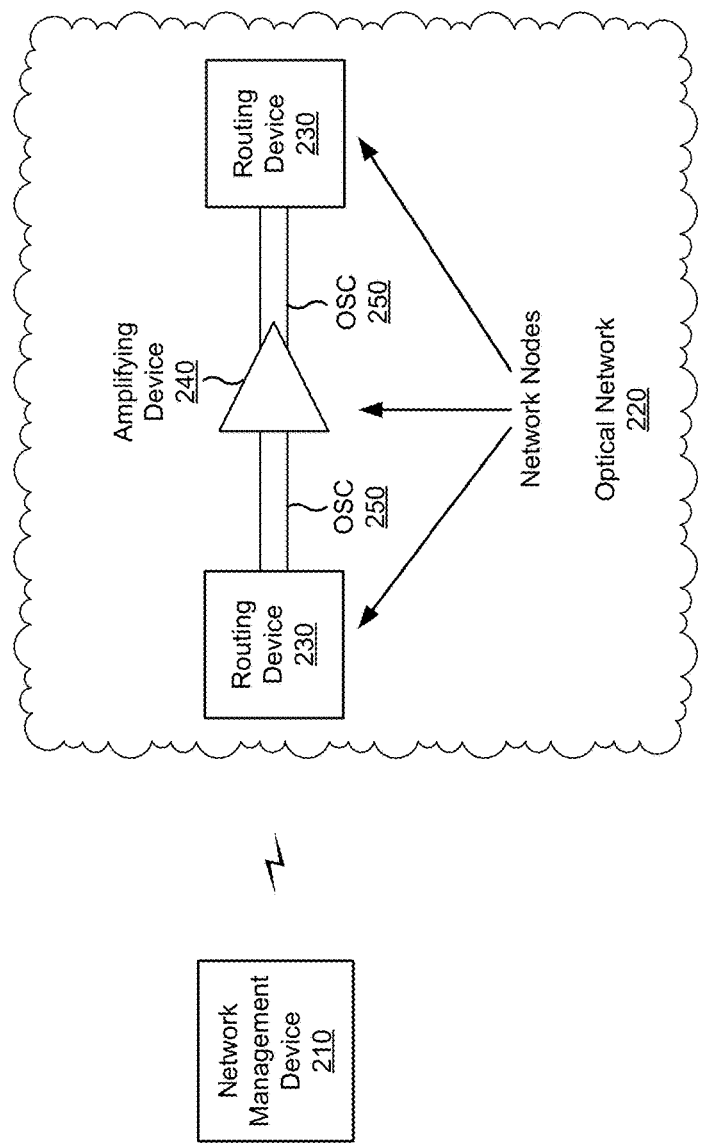
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a network management device 210 and an optical network 220 that includes multiple network nodes, such as a first routing device 230, a second routing device 230, and an amplifying device 240. Devices of environment 200 may interconnect via wired connections, wireless connections, or a combination of wired and wireless connections. For example, as shown, first routing device 230 and second routing device 230 may connect to amplifying device 240 via respective optical supervisory channels (OSCs) 250. In some implementations, first routing device 230 may connect to amplifying device 240 via a first OSC, and amplifying device 240 may connect to second routing device 230 via a second OSC.

The description, herein, will describe optical network 220 as including specific types of network nodes (e.g., first routing device 230, second routing device 230, and amplifying device 240). These network nodes are intended to be merely examples of network nodes that may be used. In some implementations, optical network 220 may include other types of network nodes.

Network management device 210 may include may include one or more devices capable of receiving, generating, storing, processing, and/or providing information associated with a network (e.g., optical network 220). For example, network management device 210 may include a computing device, such as a server or a similar type of device. Network management device 210 may be used to monitor and/or configure a network, such as optical network 220. For example, network management device 210 may be used to monitor and configure traffic in optical network 220, which may include monitoring packet traffic associated with first routing device 230, second routing device 230, and/or amplifying device 240, and/or configuring routing paths between first routing device 230, second routing device 230, and/or amplifying device 240.

In some implementations, network management device 210 may be associated with a display device that provides a user interface. In some implementations, network management device 210 may be a distributed device associated with first routing device 230 and/or second routing device 230. For example, network management device 210 may be included in first routing device 230, second routing device 230, and/or amplifying device 240. In some implementations, network management device 210 may be separate from first routing device 230, second routing device 230, and/or amplifying device 240, but may be linked to first routing device 230, second routing device 230 and/or amplifying device 240 via a protocol interface, such as an application programming interface, or the like.

Optical network 220 may include any type of network that uses light as a transmission medium. For example, optical network 220 may include a fiber-optic based network, an optical transport network, a light-emitting diode network, a laser diode network, an infrared network, and/or a combination of these or other types of optical networks. Optical network 220 may include one or more optical routes (e.g., optical lightpaths) that may specify a route along which light is carried (e.g., using one or more optical links) between first routing device 230 and second routing device 230 (e.g., via an optical link, such as OSC 250). An optical link may include an optical fiber, an optical control channel (e.g., OSC 250), an optical data channel, or the like, and may carry an optical signal (e.g., a signal associated with a particular wavelength of light). Optical network 220 may include one or more network nodes arranged in one or more network topologies (e.g. ring, mesh, star, tree, bus, etc.).

First routing device 230 and second routing device 230 may include one or more devices capable of receiving, generating, storing, processing, and/or providing data carried by an optical signal via an optical link (e.g., OSC 250). For example, first routing device 230 and second routing device 230 may include one or more optical data processing and/or optical traffic transfer devices, such as an optical amplifier (e.g., a doped fiber amplifier, an erbium doped fiber amplifier, a Raman amplifier, etc.), an optical add-drop multiplexer (OADM) (e.g., a reconfigurable optical add-drop multiplexer (ROADM), a flexibly reconfigurable optical add-drop multiplexer (FROADM) that may utilize a flexible wavelength grid, etc.), an optical source device (e.g., a laser source), an optical destination device (e.g., a laser sink), an optical multiplexer, an optical demultiplexer, an optical transmitter, an optical receiver, an optical transceiver, a photonic integrated circuit (PIC), an integrated optical circuit, a gateway, a router, a modem, a switch, a firewall, a network interface card (NIC), a hub, a bridge, or the like. In some implementations, first routing device 230 and second routing device 230 may include one or more optical components. First routing device 230 and second routing device 230 may process and/or transmit an optical signal (e.g., to another routing device 230 and/or amplifying device 240 via an optical link) to deliver the optical signal through optical network 220.

OSC 250 may include for example, an optical fiber that carries a signal (e.g., an optical signal) on a particular channel (e.g., a particular wavelength) via which first routing device 230, second routing device 230, and/or amplifying device 240 may communicate. OSC 250 may be associated with a particular wavelength, in some implementations (e.g., 1310 nm, 1510 nm, 1620 nm, etc.). Network management device 210, first routing device 230, second routing device 230, and/or amplifying device 240 may provide information to, receive information from, and/or cause information to be provided between network nodes of optical network 220 (e.g., via OSC 250, via one or more client payload channels, etc.). In some implementations, first routing device 230 may provide timing information (e.g., time-stamped packets) to second routing device 230, amplifying device 240, and/or network management device 210 via OSC 250. Additionally, or alternatively, first routing device 230 may provide key information via OSC 250 (e.g., an encryption key, a decryption key, an authentication credential etc.). In some implementations, key information may be provided along with timing information via OSC 250. In some implementations, key information may be provided via OSC 250 without timing information.

Amplifying device 240 may include an optical amplifier device or a collection of optical amplifier devices. In some implementations, amplifying device 240 may include an amplifier that may directly amplify an input optical signal (e.g., a signal supplied by first routing device 230 or second routing device 230). In some implementations, amplifying device 240 may include a semiconductor optical attenuator (SOA). When a voltage or current is applied to amplifying device 240, amplifying device 240 may amplify an optical signal.

The number and arrangement of devices and networks shown in FIG. 2 are provided as an example. In practice, environment 200 may include additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
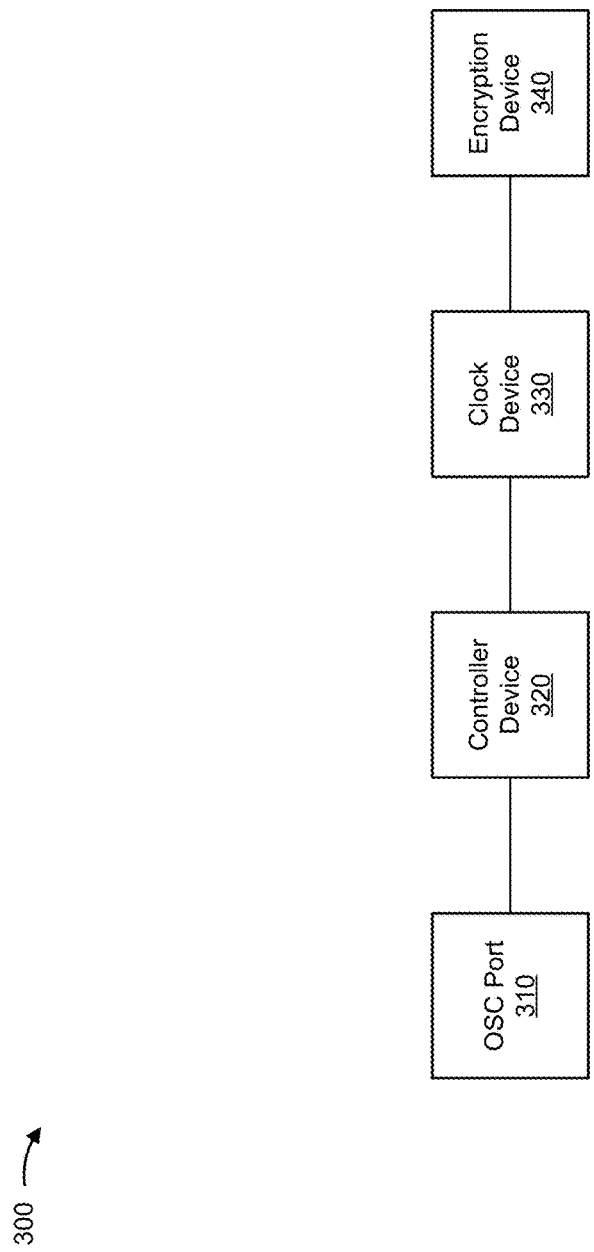
FIGS. 3 and 4 are diagrams of example components of one or more devices of FIG. 2.

FIG. 3 is a diagram of example components of a device 300. Device 300 may correspond to first routing device 230, second routing device 230, and/or amplifying device 240. In some implementations, first routing device 230, second routing device 230, and/or amplifying device 240 may include one or more devices 300 and/or one or more components of device 300. As shown in FIG. 3, device 300 may include an OSC port 310, a controller device 320, a clock device 330, and/or an encryption device 340. Components of device 300 may interconnect via wired connections, wireless connections, or a combination of wired and wireless connections.

OSC port 310 may include a point of attachment for a physical link and may be a point of entry and/or exit for traffic (e.g., packets and/or Ethernet frames) on OSC 250. In some implementations, OSC port 310 may be internal to first routing device 230, second routing device 230, and/or amplifying device 240. In some implementations, OSC port 310 may be external to first routing device 230, second routing device 230, and/or amplifying device 240.

Controller device 320 may include, for example, one or more devices capable of receiving, generating, storing, processing, and/or providing information associated with first routing device 230, second routing device 230, and/or amplifying device 240. For example, controller device 320 may include a circuit, such as an application-specific integrated circuit, a digital signal processor, or the like. Controller device 320 may cause components of routing devices 230 and/or amplifying device 240 to perform one or more operations described herein. For example, controller device 320 may cause first routing device 230 to transmit a timing signal, may cause amplifying device 240 to determine a parameter of a timing signal, or the like. In some implementations, controller device 320 may receive configuration information from another device (e.g., network management device 210, etc.) and may cause the components of first routing device 230, second routing device 230, and/or amplifying device 240 to perform the one or more operations based on the configuration information. In some implementations, controller device 320 may perform operations related to configuring routing devices 230 and/or amplifying device 240 (e.g., routing network traffic based on configuration information, etc.).

Clock device 330 may include, for example, one or more devices capable of receiving, generating, and/or processing timing signals to facilitate event synchronization and data correlation between network nodes. For example, clock device 330 may include a frequency source (e.g., an oscillator) that may provide a clock signal (e.g., a 10 MHz clock signal) to controller device 320. Clock device 330 of a network node may synchronize with clock devices 330 of other network nodes to facilitate packet transmission via OSC 250.

Encryption device 340 may include, for example, one or more devices capable of generating, encrypting, and/or decrypting a key. In some implementations, encryption device may facilitate an exchange of a key between network nodes (e.g., first routing device 230 and second routing device 230). A key may include, for example, a value to be used with an algorithm (e.g., to encrypt information, decrypt information, provide authentication, provide integrity, provide non-repudiation, etc.).

In some implementations, encryption device 340 may encrypt and/or decrypt key data for one or more channels (e.g., key data for OSC 250, key data for a particular client payload channel, key data for a different client payload channel, etc.). For example, encryption device 340 may receive key information via OSC 250. Encryption device 340 may encrypt and/or decrypt a signal including the key information (e.g., key data) using a key associated with OSC 250. The key information may include, for example, keys associated with other channels (e.g., client payload channels having wavelengths different than OSC 250). In some implementations, encryption device 340 may provide one or more client payload keys to respective interfaces (e.g., interfaces associated with client payload channels) of routing device 230. In this way, keys associated with one or more client payload channels may be transported in a secure manner via OSC 250. Further, key data distribution may be internal to a network node (e.g., first routing device 230 and/or second routing device 230), and may, thus, be facilitated in a secure manner. In some implementations, encryption device 340 may encrypt and/or decrypt signals transmitted via OSC 250 (e.g., timing signals, key signals, etc.).

The number and arrangement of components shown in FIG. 3 are provided as an example. In practice, device 300 may include additional components, fewer components, different components, or differently arranged components than those shown in FIG. 3. Furthermore, two or more components shown in FIG. 3 may be implemented within a single component, or a single component shown in FIG. 3 may be implemented as multiple, distributed components. Additionally, or alternatively, a set of components (e.g., one or more components) of device 300 may perform one or more functions described as being performed by another set of components of device 300.

Figure 4:
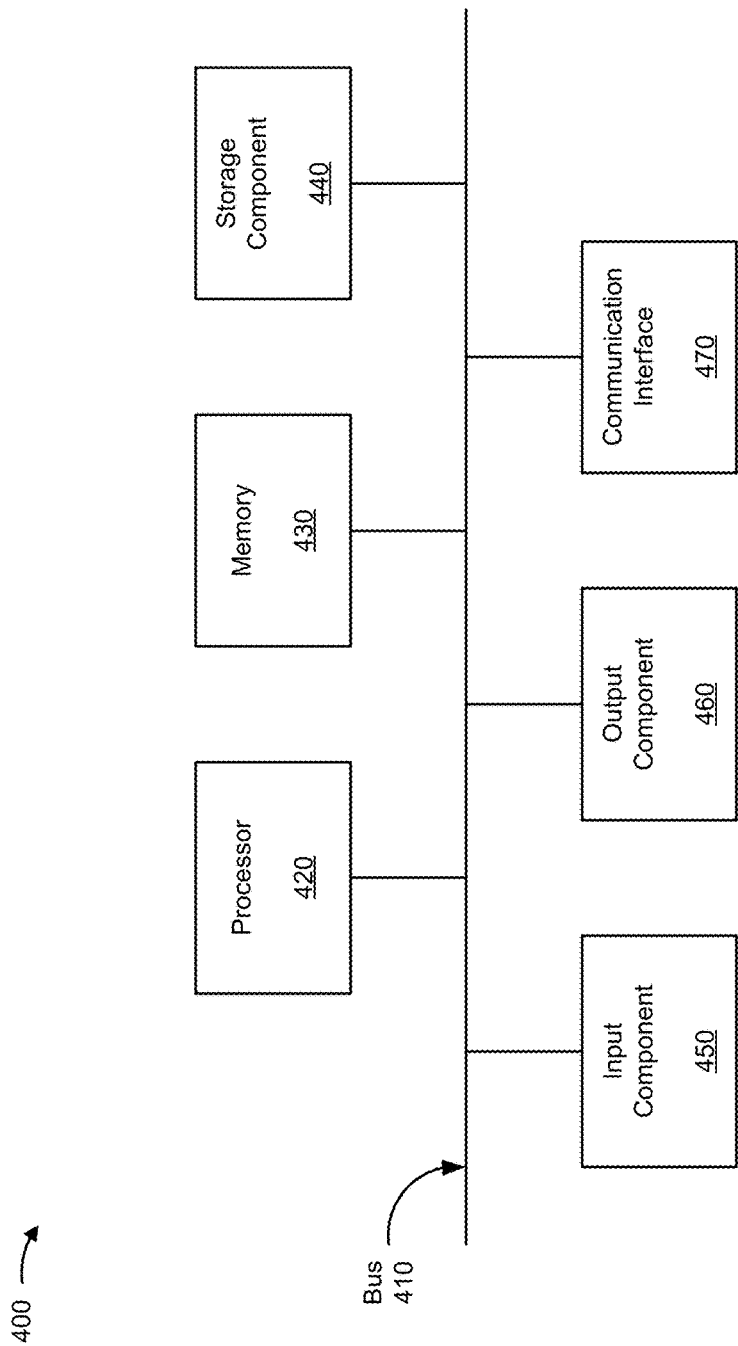

FIG. 4 is a diagram of example components of a device 400. Device 400 may correspond to network management device 210, first routing device 230, second routing device 230, and/or amplifying device 240. In some implementations, network management device 210, first routing device 230, second routing device 230, and/or amplifying device 240 may include one or more devices 400 and/or one or more components of device 400. As shown in FIG. 4, device 400 may include a bus 410, a processor 420, a memory 430, a storage component 440, an input component 450, an output component 460, and a communication interface 470.

Bus 410 may include a component that permits communication among the components of device 400. Processor 420 is implemented in hardware, firmware, or a combination of hardware and software. Processor 420 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that interprets and/or executes instructions. In some implementations, processor 420 may include one or more processors that can be programmed to perform a function. Memory 430 may include a random access memory (RAM), a read only memory (ROM), and/or another type of dynamic or static storage device (e.g., a flash memory, a magnetic memory, an optical memory, etc.) that stores information and/or instructions for use by processor 420.

Storage component 440 may store information and/or software related to the operation and use of device 400. For example, storage component 440 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 450 may include a component that permits device 400 to receive information, such as via user input (e.g., a touch screen display, a keyboard, a keypad, a mouse, a button, a switch, a microphone, etc.). Additionally, or alternatively, input component 450 may include a sensor for sensing information (e.g., a global positioning system (GPS) component, an accelerometer, a gyroscope, an actuator, etc.). Output component 460 may include a component that provides output information from device 400 (e.g., a display, a speaker, one or more light-emitting diodes (LEDs), etc.).

Communication interface 470 may include a transceiver-like component (e.g., a transceiver, a separate receiver and transmitter, etc.) that enables device 400 to communicate with other devices, such as via a wired connection, a wireless connection, or a combination of wired and wireless connections. Communication interface 470 may permit device 400 to receive information from another device and/or provide information to another device. For example, communication interface 470 may include an Ethernet interface, an optical interface, a coaxial interface, an infrared interface, a radio frequency (RF) interface, a universal serial bus (USB) interface, a Wi-Fi interface, a cellular network interface, or the like.

Device 400 may perform one or more processes described herein. Device 400 may perform these processes in response to processor 420 executing software instructions stored by a computer-readable medium, such as memory 430 and/or storage component 440. A computer-readable medium is defined herein as a non-transitory memory device. A memory device includes memory space within a single physical storage device or memory space spread across multiple physical storage devices.

Software instructions may be read into memory 430 and/or storage component 440 from another computer-readable medium or from another device via communication interface 470. When executed, software instructions stored in memory 430 and/or storage component 440 may cause processor 420 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 4 are provided as an example. In practice, device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

Figure 5:
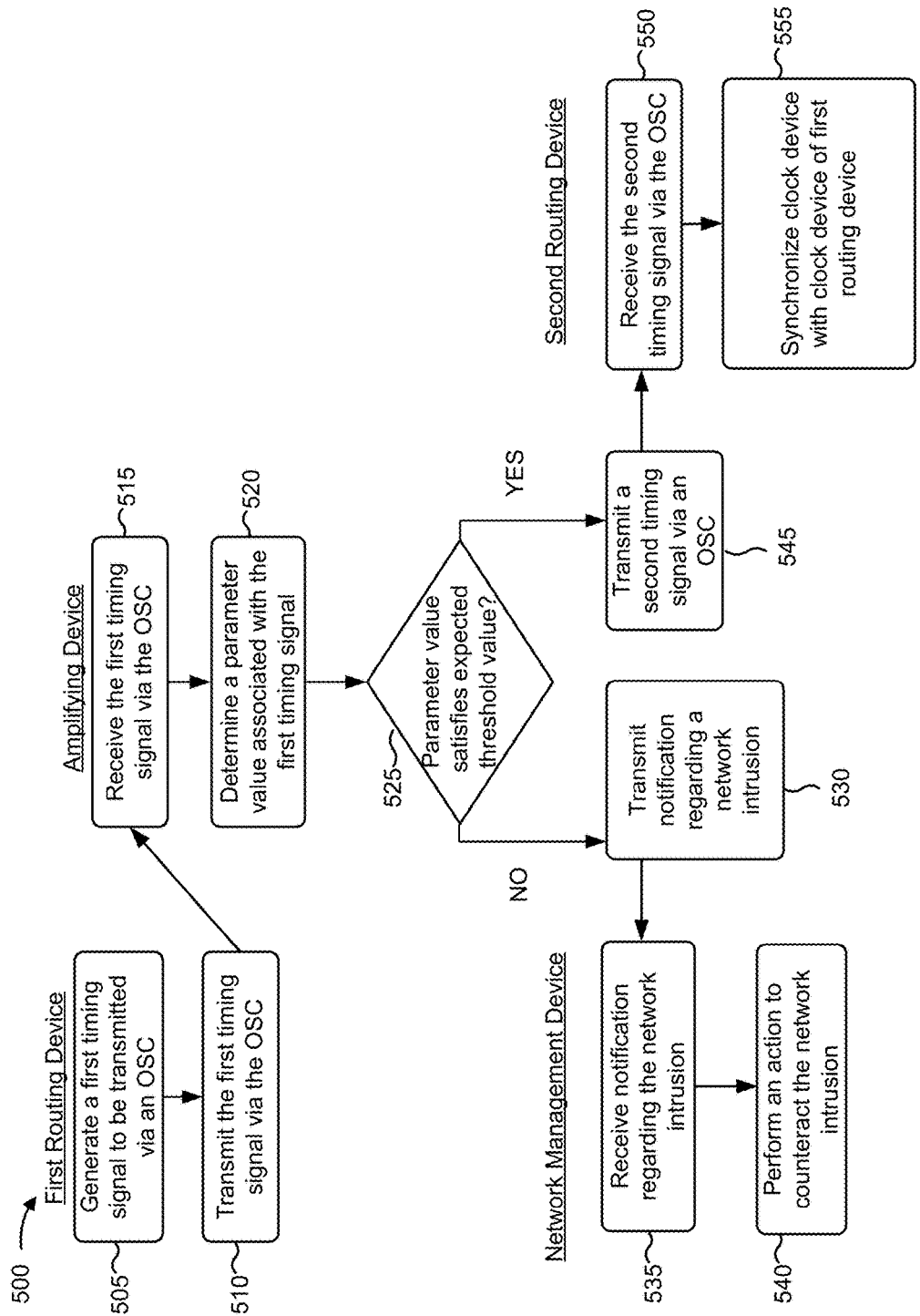
FIG. 5 is a flow chart of an example process for providing timing synchronization and intrusion detection via an optical supervisory channel (OSC).

FIG. 5 is a flow chart of an example process 500 for providing timing synchronization and intrusion detection via an OSC. In some implementations, one or more process blocks of FIG. 5 may be performed by one or more network nodes. For example, one or more process blocks of FIG. 5 may be performed by first routing device 230, second routing device 230, and/or amplifying device 240. In some implementations, one or more process blocks of FIG. 5 may be performed by another device or a group of devices separate from or including a network node, such as network management device 210.

As shown in FIG. 5, process 500 may include generating a first timing signal to be transmitted via an OSC (block 505). For example, first routing device 230 may generate a first timing signal to be transmitted via OSC 250 to second routing device 230 and/or amplifying device 240. In some implementations, optical network 220 may use a master/slave configuration for clock distribution. For example, clock device 330 of first routing device 230 may be designated as a master clock, and clock device 330 of second routing device 230 may be designated as a slave clock. In this way, first routing device 230 may transmit timing signals via OSC 250, and clock device 330 of second routing device 230 may synchronize with clock device 330 of first routing device 230.

Clock device 330 of first routing device 230 may be programmed with a reference time (e.g., a reference time and/or date), and may output timing signals (e.g., signals including time-stamped packets) based on the reference time (e.g., a Coordinated Universal Time (UTC), International Atomic Time (TAI), etc.). In some implementations, clock device 330 of first routing device 230 may receive a reference time from another network node, a global positioning system (GPS), a clock in communication with optical network 220, and/or network management device 210. In some implementations, clock device 330 of first routing device 230 may be associated with a reference frequency signal. For example, clock device 330 may generate a reference frequency signal (e.g., 10 MHz, 25 MHz, 125 MHz, etc.) to output to network nodes of optical network 220 for synchronization.

In some implementations, the first timing signal may include key data. For example, encryption device 340 may encrypt one or more keys to be transmitted from first routing device 230 to amplifying device 240 and/or second routing device 230. In some implementations, a key may be linked to the reference time of clock device 330 of first routing device 230 (e.g., the time-stamped packet). For example, a key may be valid for a threshold amount of time (e.g., a time value). First routing device 230 may exchange a key with second routing device 230 and/or amplifying device 240 via OSC 250. For example, key data may be exchanged on a separate channel (e.g., OSC 250) than client payload data (e.g., via client payload channels). In this way, if an intrusion is detected on OSC 250, client payload data may not be compromised.

In some implementations, first routing device 230 may transmit key data via OSC 250 without timing data. Additionally, or alternatively, first routing device 230 may transmit key data via OSC 250 along with timing data. For example, first routing device 230 may encrypt and transmit key data (e.g., associated with client payload channels) via OSC 250. In this way, keys associated with client payload channels may be distributed over OSC 250 in a secure manner.

As further shown in FIG. 5, process 500 may include transmitting the first timing signal via the OSC to synchronize network nodes (block 510). For example, first routing device 230 may transmit the first timing signal via OSC 250 to synchronize clock device 330 of second routing device 230 with clock device 330 of first routing device 230. For example, first routing device 230 may transmit the first timing signal, including a time-stamped packet, at a reference power (e.g., a dBm value). First routing device 230 may encode the first timing signal, and may transmit the first timing signal via OSC 250 at a particular wavelength (e.g., 1310 nm, 1510 nm, 1620 nm, etc.).

To synchronize network nodes, first routing device 230 may iteratively transmit and/or receive timing signals. In some implementations, network nodes of optical network 220 may synchronize according to a standard (e.g., IEEE 1588, etc.). For example, by iteratively transmitting and receiving timing signals, second routing device 230 may determine a network propagation delay (e.g., the time required for a signal to travel from first routing device 230 to second routing device 230, and vice versa) and/or an offset (e.g., a time difference between clock device 330 of second routing device 230 and clock device 330 of first routing device 230). By determining the offset, second routing device 230 may adjust clock device 330 of second routing device 230 to synchronize with clock device 330 of first routing device 230. By utilizing OSC 250, network nodes may synchronize by distributing timing signals over a single channel, as compared to distributing timing signals over multiple client payload channels. Thus, processor, memory, and/or network resources may be saved.

As further shown in FIG. 5, process 500 may include receiving the first timing signal via the OSC (block 515). For example, amplifying device 240 may receive the first timing signal from first routing device 230. Based on receiving the first timing signal, amplifying device 240 may, for example, synchronize a clock device 330 of amplifying device 240 with clock device 330 of first routing device 230.

As further shown in FIG. 5, process 500 may include determining a parameter value associated with the first timing signal (block 520). For example, amplifying device 240 may determine a parameter value associated with the first timing signal to monitor for an intrusion on optical network 220. In some implementations, the parameter value may include a time value included in and/or determined based on the first timing signal. For example, the parameter value may be a time of transmission of the first timing signal, as measured by clock device 330 of first routing device 230 (e.g., time data included in the time-stamped packet). Additionally, or alternatively, the parameter value may be a time of reception of the first timing signal, as measured by clock device 330 of amplifying device 240.

By determining the time of transmission and/or reception of the first timing signal, clock device 330 of amplifying device 240 may determine a propagation delay value (e.g., a transmission duration from first routing device 230 to amplifying device 240) of the first timing signal. Additionally, or alternatively, amplifying device 240 may determine an offset value (e.g., a time difference between clock device 330 of second routing device 230 and clock device 330 of first routing device 230) of clock device 330 of amplifying device 240.

In some implementations, the parameter value may be a determined value associated with a signal transmission (e.g., a network propagation delay value, a packet latency value, etc.). Additionally, or alternatively, the parameter value may be a measured value associated with one or more signal transmissions (e.g., a packet delay variation value, a jitter value, etc.).

In some implementations, the parameter value may be a received power value of the first timing signal. For example, amplifying device 240 may determine a received power value of the first timing signal (e.g., a dBm value). Additionally, or alternatively, amplifying device 240 may determine a power attenuation of the first timing signal (e.g., a dB value). In some implementations, amplifying device 240 may determine a power gain of the first timing signal (e.g., a dB gain value). In some implementations, amplifying device 240 may determine a received power value of a signal transmitted via OSC 250. Additionally, or alternatively, amplifying device 240 may determine received power values of signals transmitted via client payload channels. In some implementations, amplifying device 240 may monitor for intrusion on optical network 220 by determining parameter values associated with timing signals and comparing the determined parameter values with expected values, as described in more detail below.

As further shown in FIG. 5, process 500 may include determining whether the parameter value satisfies an expected threshold value (block 525). For example, amplifying device 240 may determine whether a parameter value, associated with the first timing signal, satisfies an expected threshold value. In some implementations, the expected threshold value may include a particular value (e.g., a network propagation delay value, a signal power attenuation value, a packet delay variation value, etc.). Additionally, or alternatively, the expected threshold value may include a range of values. In some implementations, amplifying device 240 may be configured with one or more expected threshold values. Additionally, or alternatively, network management device 210 may provide one or more expected threshold values to amplifying device 240. In some implementations, amplifying device 240 may determine one or more expected threshold values based on iteratively receiving and/or transmitting timing signals.

In some implementations, amplifying device 240 may determine whether a determined network propagation delay value satisfies an expected network propagation delay threshold value (e.g., a time value). For example, amplifying device 240 may determine whether a measured transmission duration of a timing signal from first routing device 230 to amplifying device 240 satisfies an expected threshold. By storing information that identifies the transmission capability of first routing device 230 and/or OSC 250, and/or the distance between first routing device 230 and amplifying device 240, amplifying device 240 may determine an expected transmission duration. Additionally, or alternatively, amplifying device 240 may be programmed with an expected transmission duration. In some implementations, amplifying device 240 may determine an expected transmission duration by iteratively distributing timing signals with first routing device 230, as described elsewhere herein.

In some implementations, amplifying device 240 may determine whether a determined packet delay variation value satisfies an expected packet delay variation threshold value. For example, amplifying device 240 may determine whether a measured time between the receptions of successive packets satisfies an expected threshold. In this way, amplifying device 240 may monitor optical network 220 for intruding devices. For example, assume that an intruding device is inserted between first routing device 230 and amplifying device 240. By tapping the optical fiber of OSC 250, an intruding device may attenuate timing signals transmitted from routing device 230 to amplifying device 240. Assume further that an intruding device attempts to mitigate signal attenuation by implementing an amplifier at the point of intrusion. By doing so, the intruding device may introduce additional signal processing to a timing signal and may, thus, increase the latency of a timing signal. Amplifying device 240 may detect an intruding device by determining whether a determined value (e.g., a packet delay variation value) satisfies an expected threshold value. For example, the expected threshold value may include a packet delay variation value range. Amplifying device 240 may measure packet latency values before and/or after the intruding device intervened on OSC 250. In some implementations, amplifying device 240 may determine a packet delay variation value that exceeds the expected threshold value and/or may notify another device, such as network management device 210, as described in more detail below.

In some implementations, amplifying device 240 may determine whether a determined signal power value satisfies an expected signal power threshold value. For example, amplifying device 240 may determine whether a determined signal power value and/or a determined signal power attenuation value satisfy an expected threshold value. In this way, amplifying device 240 may detect an intruding device. For example, assume that an intruding device is tapping the optical fiber of OSC 250, but is not introducing any additional signal processing (e.g., not using an amplifier). Amplifying device 240 may determine that network propagation delay values and/or packet delay variation values satisfy expected thresholds. However, amplifying device 240 may determine that a measured signal power value is lower than the expected threshold. For example, the intruding device may attenuate the timing signal, which may cause the power value of the timing signal to not satisfy the expected threshold value. Moreover, in cases where the intruding device implements an amplifier, the amplifier of the intruding device may introduce a power gain, which may cause a power value of the timing signal to not satisfy the expected threshold. Amplifying device 240 may determine that a power value of the timing signal does not satisfy the expected threshold, and may notify a network node, as described below.

In some implementations, amplifying device 240 may determine whether multiple parameter values satisfy corresponding expected threshold values. For example, amplifying device 240 may detect a potential intrusion by performing an analysis of the determined parameter values (e.g., determining whether a particular combination of parameter values satisfy expected threshold values, determining whether a parameter value and a different parameter value satisfy respective expected threshold values, determining whether a parameter value or a different parameter value satisfy an expected threshold value, etc.). In some implementations, amplifying device 240 may determine whether multiple parameter values (e.g. corresponding to the same parameter value) satisfy expected threshold values (e.g., may average determined parameter values, or the like). Additionally, or alternatively, amplifying device may determine whether multiple parameter values (corresponding to different parameter values) satisfy expected threshold values.

Additionally, or alternatively, amplifying device 240 may assign a particular weight value to a parameter value based on the likelihood that the parameter value accurately indicates an intrusion. For example, amplifying device 240 may determine that an intrusion is more likely to exist if a particular parameter value does not satisfy an expected threshold value. Additionally, or alternatively, amplifying device 240 may determine that an intrusion is more likely to exist if a particular combination of parameter values do not satisfy corresponding expected threshold values. Amplifying device 240 may perform an analysis of determined parameter values, and may notify a network node of a potential intrusion based on the analysis, as described below.

As further shown in FIG. 5, if the parameter value does not satisfy the expected threshold value (block 525—NO), then process 500 may include transmitting a notification regarding a network intrusion (block 530). In some implementations, if a particular parameter value does not satisfy the expected threshold value, then amplifying device 240 may determine that an intrusion exists. Additionally, or alternatively, if a particular combination of parameter values (e.g., multiple parameter values, a parameter value and a different parameter value, a parameter value or a different parameter value, etc.) do not satisfy corresponding expected threshold values, amplifying device 240 may determine that an intrusion exists. For example, if amplifying device 240 determines that a parameter value of the first timing signal does not satisfy the expected threshold value, then amplifying device 240 may notify network management device 210 of a possible network intrusion. In some implementations, the expected threshold value may be a network propagation delay value, a packet latency value, a packet delay variation value, a power value, or the like.

In some implementations, the notification regarding the network intrusion may identify the first routing device 230 and/or the amplifying device 240 (e.g., using network addresses), so that network management device 210 may pinpoint a location of the intrusion and take corrective action (e.g., by re-routing traffic so that traffic does not take the same path between first routing device 230 and amplifying device 240, by notifying a network operator as to the location of the intrusion, etc.). Additionally, or alternatively, the notification regarding the network intrusion may identify the second routing device 230, so that network management device 210 may instruct first routing device 230 to provide traffic to the second routing device 230 via a different route.

In some implementations, amplifying device 240 may notify second routing device 230 of the intrusion. Additionally, or alternatively, amplifying device 240 may prevent packets from being transmitted to second routing device 230 by discarding packets associated with the intrusion (e.g., discarding packets received from first routing device 230). Additionally, or alternatively, amplifying device 240 may notify first routing device 230 and/or second routing device 230 regarding the intrusion, so that first routing device 230 and/or second routing device 230 may notify a server and/or a client associated with packets associated with the intrusion.

As further shown in FIG. 5, process 500 may include receiving the notification regarding the network intrusion (block 535). For example, network management device 210 may receive the notification from amplifying device 240. In some implementations, network management device 210 may monitor traffic on OSC 250 and/or re-route traffic via OSC 250 based on receiving the notification from amplifying device 240, as described in more detail below.

As further shown in FIG. 5, process 500 may include performing an action to counteract the network intrusion (block 540). For example, network management device 210 may monitor traffic between first routing device 230 and amplifying device 240 based on receiving the notification. In some implementations, network management device 210 may monitor traffic transmitted between first routing device 230 and amplifying device 240 via OSC 250. Additionally, or alternatively, network management device 210 may monitor traffic transmitted between first routing device 230 and amplifying device 240 via one or more client payload channels. In some implementations, the traffic may include timing signals transmitted from first routing device 230 to amplifying device 240. Additionally, or alternatively, the traffic may include timing signals transmitted from amplifying device 240 to first routing device 230.

In some implementations, network management device 210 may monitor packets transmitted between first routing device 230 and amplifying device 240. For example, network management device 210 may monitor alterations in packets transmitted between first routing device 230 and amplifying device 240. First routing device 230 may copy packets, before transmitting the packets to amplifying device 240, and provide the packets to network management device 210. Moreover, amplifying device 240 may copy packets received from first routing device 230 and may provide the packets to network management device 210. Network management device 210 may then compare corresponding packets to determine modifications of the packets, characteristics of the packets, etc.

In some implementations, network management device 210 may monitor packets transmitted between first routing device 230 and amplifying device 240 to determine a source of the intrusion. For example, network management device 210 may compare copied packets (e.g., provided by first routing device 230 and amplifying device 240) to determine a discrepancy in client devices and/or server devices associated with corresponding packets. For instance, network management device 210 may determine that a packet originally intended for a particular client device was re-addressed to a different client device. Network management device 210 may determine the newly addressed client device as a possible source of intrusion, and may prevent any packets from being transmitted to that client device. Additionally, or alternatively, network management device 210 may determine that a packet originally including a particular server device address may have been altered to include a different server device address. Network management device 210 may prevent the packet from being transmitted to a client device and/or may prevent packets from being transmitted to the different server device address.

In some implementations, network management device 210 may re-route traffic from first routing device 230 to another network node. For example, network management device 210 may re-route traffic to avoid an optical link, between two network nodes, where an intrusion is known to be located. In this way, routing device 230 may bypass an intruding device while remaining in communication with network nodes (e.g., second routing device 230) of optical network 220.

As further shown in FIG. 5, if the parameter value satisfies the expected threshold value (block 525—YES), then process 500 may include transmitting a second timing signal via an OSC (block 545). For example, if the parameter value satisfies the expected threshold value, then this may indicate that there is no intrusion between first routing device 230 and amplifying device 240. In this case, amplifying device 240 may transmit a second timing signal to second routing device 230 to synchronize clock device 330 of second routing device 230 with clock device 330 of first routing device 230. In some implementations, the second timing signal may include a time-stamped packet (e.g., a packet time-stamped by first routing device 230). Additionally, or alternatively, the second timing signal may include a key to be exchanged between first routing device 230 and second routing device 230. In some implementations, the key may expire based on clock device 330 of first routing device 230 (e.g., based on the time-stamped packet).

In some implementations, second routing device 230 may receive key data from first routing device 230 via OSC 250. For example, signals including the key data may be transported via OSC 250 along with timing data. Additionally, or alternatively, signals including key data may be transported via OSC 250 without the timing data. Second routing device 230 may decrypt a signal including the key data (e.g., using a key associated with OSC 250), and may access one or more keys associated with client payload channels. Second routing device 230 may distribute keys associated with client payload channels to respective interfaces of the client payload channels. In this way, keys may be distributed internally of second routing device 230.

As further shown in FIG. 5, process 500 may include receiving the second timing signal via the OSC (block 550). For example, second routing device 230 may receive the second timing signal from amplifying device 240. In some implementations, after receiving the second timing signal, clock device 330 of second routing device 230 may synchronize with clock device 330 of first routing device 230 in a similar manner as described above (e.g., by iteratively transmitting and sending timing signals). In this way, second routing device 230 may determine a network propagation delay value between second routing device 230 and first routing device 230 and/or an offset value between clock device 330 of second routing device 230 and clock device 330 of first routing device 230.

As further shown in FIG. 5, process 500 may include synchronizing a clock device of the second routing device with a clock device of the first routing device (block 555).

For example, clock device 330 of second routing device 230 may synchronize with clock device 330 of first routing device 230 by determining a network propagation delay value and/or an offset value. In some implementations, amplifying device 240 may introduce latency in timing signals between first routing device 230 and second routing device 230. By iteratively communicating with first routing device 230, second routing device 230 may determine expected threshold values for network propagation delay, latency, and/or packet delay variation of timing signals transmitted between first routing device 230 and second routing device 230.

In some implementations, second routing device 230 may detect an intrusion between amplifying device 240 and second routing device 230, by performing similar steps as discussed above (e.g., by performing blocks 520 and 525). For example, second routing device 230 may determine a parameter value of the second timing signal, and may determine whether the parameter value satisfies an expected threshold, etc. If an intrusion is detected, second routing device 230 may transmit a notification regarding a network intrusion to network management device 210 (e.g., perform block 530).

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Implementations described herein may allow network nodes to synchronize timing by distributing clock information via an OSC. Moreover, distribution of clock information via the OSC may enable the network nodes to detect intrusion between two nodes. In this way, timing information may be exchanged via the OSC in a secure manner. Implementations described herein may save processor, memory, and/or network resources by distributing timing information over a single channel, as compared to distributing timing information over multiple client payload channels.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
  a memory; and
  a processor to:
    receive, via a first optical supervisory channel, a first timing signal from a first network node,
      the first timing signal being generated by a first clock, of the first network node, and being used to synchronize the first clock, of the first network node, and a second clock of a second network node;
    determine a parameter value based on the first timing signal;
    determine whether the parameter value satisfies a threshold value; and
    selectively transmit:
      a second timing signal, via a second optical supervisory channel, to the second network node based on determining that the parameter value satisfies the threshold value,
        the second timing signal being used to synchronize the second clock, of the second network node, with the first clock of the first network node, or
      a notification regarding a network intrusion based on determining that the parameter value does not satisfy the threshold value.

2. The device of claim 1, where the first network node is a first routing device, the second network node is a second routing device, and the device is an amplifying device.

3. The device of claim 1, where the processor, when determining whether the parameter value satisfies the threshold value, is to:
  compare the parameter value and the threshold value,
    the parameter value indicating a received power of the first timing signal,
    the threshold value indicating an expected received power of the first timing signal.

4. The device of claim 1, where the processor, when selectively transmitting the second timing signal, is to:
  prevent transmission of the second timing signal to the second network node based on determining that the parameter value does not satisfy the threshold value.

5. The device of claim 1, where the notification includes information that identifies the device and the first network node.

6. The device of claim 1, where the first timing signal is programmed based on a reference time.

7. The device of claim 1, where the parameter value includes a time of transmission of the first timing signal.

8. A system comprising:
a first network node to:
receive, via a first optical supervisory channel, a first timing signal from a second network node,
the first timing signal being generated by a first clock, of the second network node, and being used to synchronize the first clock, of the second network node, and a second clock of a third network node;
determine a parameter value based on the first timing signal;
determine whether the parameter value satisfies a threshold value; and
selectively transmit:
a second timing signal, via a second optical supervisory channel, to the third network node based on determining that the parameter value satisfies the threshold value,
the second timing signal being used to synchronize the second clock, of the third network node, with the first clock of the second network node, or
a notification regarding a network intrusion based on determining that the parameter value does not satisfy the threshold value.

9. The system of claim 8, where the first network node, when
selectively transmitting the second timing signal, is to:
transmit another notification to the second network node based on determining that the parameter value does not satisfy the threshold value,
the other notification including an instruction for the second network node to not transmit network traffic to the first network node.

10. The system of claim 8, where:
the threshold value includes a threshold power value; and
the parameter value includes a power value differing by a threshold amount from the threshold power value when the parameter value does not satisfy the threshold value.

11. The system of claim 8, where:
the threshold value includes a threshold timing value; and
the parameter value includes a timing value greater than the threshold timing value when the parameter value does not satisfy the threshold value.

12. The system of claim 8, where the first timing signal includes a key that expires based on the first clock of the second network node, and
where the key is associated with a channel that is different than the first optical supervisory channel and the second optical supervisory channel.

13. The system of claim 8, where the second timing signal and the first timing signal are a same signal.

14. The system of claim 8, where the threshold value indicates at least one of:
an expected network propagation delay value,
an expected packet latency value,
an expected packet delay variation value, or
an expected jitter value.

15. A method comprising:
receiving, by a first network node, a first timing signal, via an optical supervisory channel, from a second network node,
the first timing signal being generated by a first clock, of the second network node, and being used to synchronize the first clock, of the second network node, and a second clock of a third network node;
determining, by the first network node, a parameter value based on the first timing signal;
determining, by the first network node, whether the parameter value satisfies a threshold value; and
selectively outputting, by the first network node,
a second timing signal, via a second optical supervisory channel, based on determining that the parameter value satisfies the threshold value,
or
a notification regarding a network intrusion,
the notification being output based on determining that the parameter does not satisfy the threshold value.

16. The method of claim 15, where determining whether the parameter value satisfies the threshold value comprises:
comparing the parameter value with the threshold value,
the parameter value including a transmission duration of the first timing signal between the first network node and the second network node, and
the threshold value including an expected transmission duration of the first timing signal between the first network node and the second network node.

17. The method of claim 15, where determining whether the parameter value satisfies the threshold value comprises:
comparing the parameter value with the threshold value,
the parameter value including a received power of the first timing signal, and
the threshold value including an expected received power of the first timing signal.

18. The method of claim 15, where the optical supervisory channel directly connects the first network node and the second network node.

19. The method of claim 15, where the threshold value is received from a network management device.

20. The method of claim 15, where selectively outputting the notification comprises:
outputting the notification to a network management device based on determining that the parameter value does not satisfy the threshold value.

* * * * *